J. B. GABRIELSON & G. E. SWENSON.
SPRING TIRE.
APPLICATION FILED JAN. 8, 1918.
1,268,957.
Patented June 11, 1918.
2 SHEETS—SHEET 1.
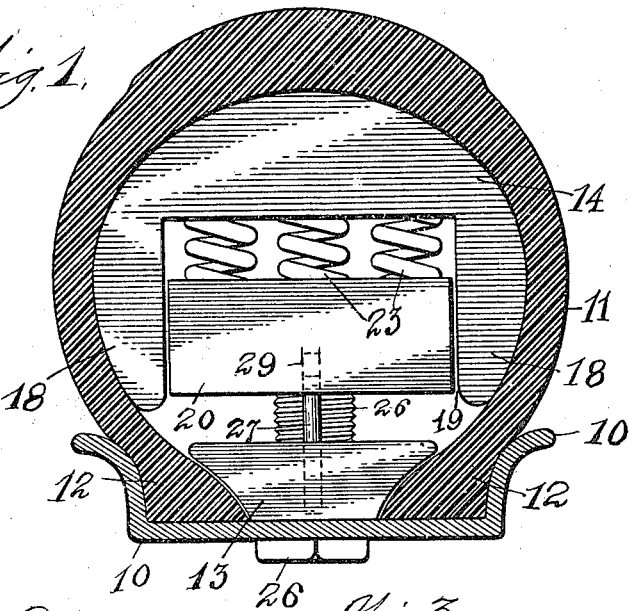
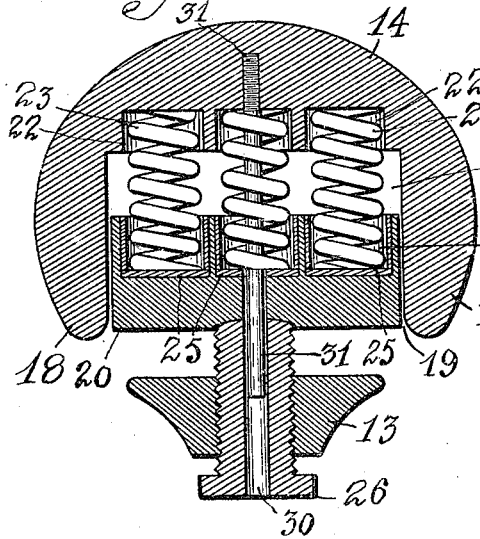
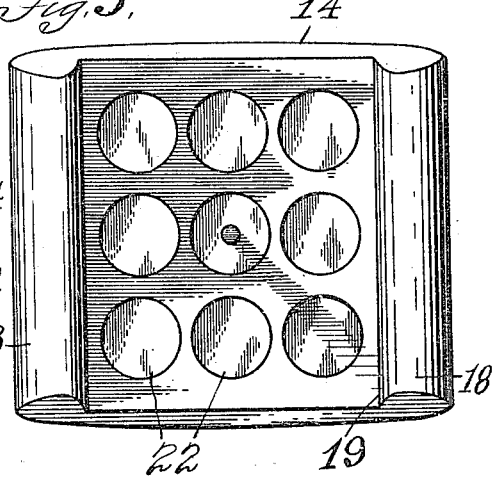
Witness
J. E. Nordstrom
H. A. Sandberg
Inventor
John B. Gabrielson
and
Gustaf E. Swenson
By S. Arthur Baldwin
Attorney J. B. GABRIELSON & G. E. SWENSON.
SPRING TIRE.
APPLICATION FILED JAN. 8, 1918.
1,268,957.
Patented June 11, 1918.
2 SHEETS—SHEET 2.
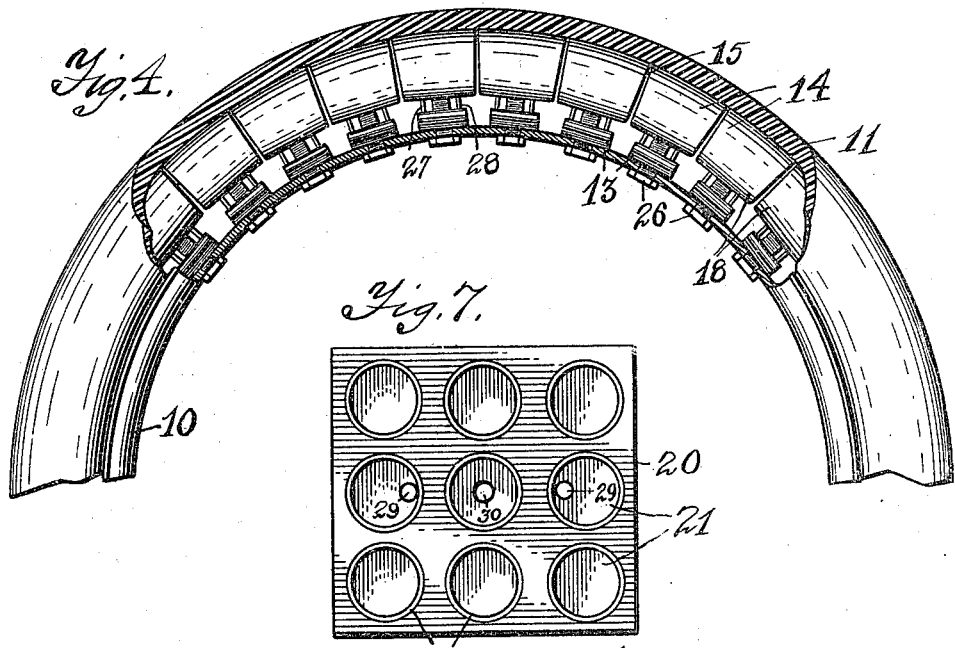
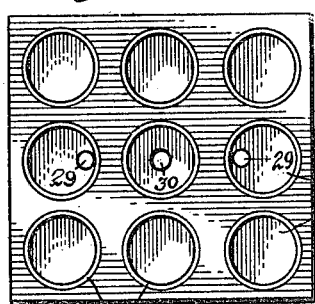
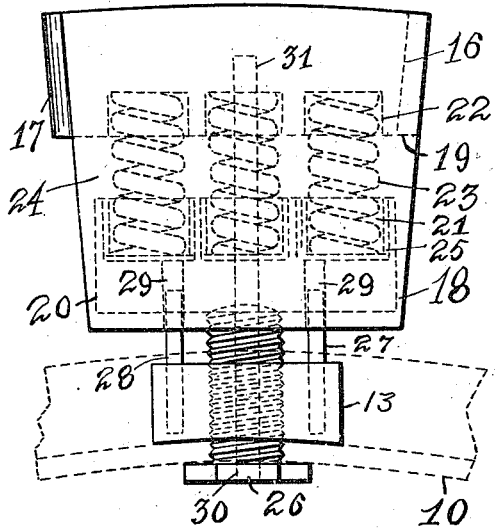
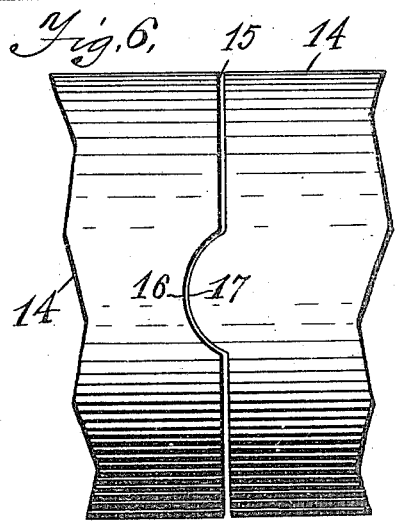
Witness
J. E. Nordstrom
H. A. Sandberg
Inventor
John B. Gabrielson
and
Gustaf E. Swenson,
By S. Arthur Baldwin,
Attorney

UNITED STATES PATENT OFFICE.

JOHN B. GABRIELSON AND GUSTAF E. SWENSON, OF SPRINGVILLE, NEW YORK.

SPRING-TIRE.

1,268,957.

Specification of Letters Patent. Patented June 11, 1918.

Application filed January 8, 1918. Serial No. 210,832.

*To all whom it may concern:*

Be it known that we, JOHN B. GABRIELSON, a subject of the King of Sweden, and GUSTAF E. SWENSON, a citizen of the United States, residing at Springville, in the county of Erie and State of New York, have invented certain new and useful Improvements in Spring-Tires, of which the following, taken in connection with the accompanying drawings, is a specification.

The invention relates to spring wheels; and the improvement consists in providing the tire of the wheel with a series of radial segments which have spring supports therein and radial tension therefor attached to the rim or felly of the wheel, said radial segments being shaped to fit a suitable rubber or resilient casing so that the tire will be able to stand hard usage upon the roadway without affecting its resilient qualities; and the invention consists in the construction and arrangement of parts as shown in the accompanying drawings and hereinafter described and claimed.

In the drawings, Figure 1 is a crosswise sectional view of the resilient casing and rim or felly, showing an end elevation of the U-shaped segment and the springs and supporting block with the tension screw for the same. Fig. 2 is a crosswise sectional view through the center of one of the radial segments and spring blocks showing the construction and arrangement of tension screw and the combination nut and block for holding the casing in position within the rim of the wheel. Fig. 3 is a plan view of the inner side of one of the radial segments showing the openings for the springs. Fig. 4 is a side elevation of a portion of the tire with the casing broken away showing the series of radial segments and the blocks for tensionally holding the same and also for holding the resilient casing. Fig. 5 is a side elevation of a modification of one of the segmental blocks. Fig. 6 is a plan view of said modification of the U-shaped segmental blocks showing an interlocking joint between the same. Fig. 7 is a plan view of the inner side of the block which holds the springs against the radial segments.

Like characters of reference refer to corresponding parts in the several views.

The numeral 10 designates the rim or felly of the wheel which is preferably made with the flanges on each side to hold the casing or hollow tire 11, the tire edges being thickened at 12 so as to be held by the series of blocks 13 which are shaped to hold the thickened edges 12 at spaced intervals.

The main filler for the casing or tire 11 consists of the series of U-shaped segmental blocks 14 which are curved on their periphery to fit the inner side of the casing or tire 11, the joints 15 between segments 14 being usually formed on radial lines from the center of the wheel with sufficient play therebetween so that said segments 14 may have independent radial movement as the tire runs over obstacles. In order to keep the segments 14 from getting out of line for certain uses they interlock with one another, as shown in the modification in Figs. 5 and 6, a curved opening 16 and a projection 17 being provided on the adjacent ends of the segments 14 so that they interfit thereby insuring perfect alinement. The sides 18 of the segment 14 extend down only a portion of the distance toward the blocks 13 and thus allow sufficient room for the movement of the segments 14 with relation to the blocks 13.

An opening 19 is provided in the segment 14 into which a block 20 extends which is slidably mounted and so fitted as to freely reciprocate in the opening 19. The block 20 is provided with a plurality of round openings or sockets 21 and the inner wall of the segment 14 is also provided with a corresponding number of openings or sockets 22 to receive therein the opposite ends of the coil springs 23. The number of the springs 23 is apportioned to their size but there are preferably about nine to each segment 14.

The space 24 between the block 20 and the inner wall of the segment 14 is apportioned to the space between the sides 18 and the block 13 so that said sides 18 can move toward the block 13 a sufficient distance to relieve the tire when under pressure. The openings 21 are preferably bushed as shown at 25 so as to take up the wear from the movement of the springs 23.

The block 20 is held in position by means of a screw tension bolt 26 which extends through the block 13, the block 13 acting as a nut for the screw bolt 26 as well as holding means for the flexible tire casing 11. The inner end of the screw bolt 26 is received in a central hollowed portion on the inner side of the block 20 so as to form a socket joint with the rounded end of the bolt 26 so that said blocks and the segments 14 can rock in different directions on the end of the bolt 26 thereby permitting the segments 14 to adapt themselves to the inequalities of the roadway. The bolt 26 extends through the rim 10 and has a hexagonal or squared head so that said bolt can be adjusted and thereby the tension of the springs 23 with the tire casing 11 may be adjusted as desired.

In order to hold the block 13 in line to limit turning thereof a pair of pins 27 and 28 are attached in the block 13, one on each side of the tension bolt 26 which extend into holes 29 in the block 20 so that said pins 27 and 28 are free to move inward and outward in said holes 29.

A hole 30 is provided lengthwise through the screw bolt 26 and a pin 31 is provided in the inner wall of the segment 14 which extends down into the hole 30, the pin 31 extending through the central spring 23 and through a hole central of the block so that said pin 31 can move upward and downward in the hole 30 in the screw bolt 26 with the segment 14 as the tire is compressed. The pin 31 thereby holds all the parts in line and also assists in the assembling of the parts.

It is obvious that the U-shaped radial segments 14 form a continuous filler around and within the resilient casing 11 to which any desired degree of tension or resilient pressure may be given by means of the tension screws 26 which extend through and within the rim 10 of the wheel and also that any increase of tension holds the combination block nuts 13 all the more firmly upon the inner lengthwise edges of the casing or rubber tire 11 thereby binding all the parts in correct position and permitting the inward movement of the segments 14 upon the blocks 20 when the periphery of the tire is compressed.

We claim as new:—

1. A spring wheel comprising a wheel rim, a hollow casing attachable to said rim, a series of segmental U-shaped blocks fitting around within said casing, blocks slidably mounted within said U-shaped blocks, a plurality of coil springs separating each of said segmental U-shaped blocks and said slidably mounted blocks, and screw bolts to give tension to said springs through said wheel rim.

2. A spring tire comprising a series of U-shaped blocks placed end to end and having sockets therein, a corresponding series of blocks fitting within said U-shaped blocks one to each and having corresponding sockets therein, coil springs with ends in said sockets to resiliently separate said blocks, means to hold said blocks within said U-shaped blocks, and a tire casing to cover said parts.

3. A spring wheel comprising a wheel rim, a hollow casing attachable to said rim, a series of segmental U-shaped blocks having radial joints therebetween said U-shaped blocks having a plurality of sockets therein, blocks slidably mounted within said U-shaped blocks one to each having a plurality of sockets therein corresponding to said U-shaped blocks to form pairs, a corresponding plurality of coil springs with ends in said sockets one to each pair, nut blocks within said rim and hollow casing one to each of said segmental U-shaped blocks to attach said casing to said rim, and screw bolts extending through said nut blocks and wheel rim to bear against said blocks slidably mounted within said U-shaped blocks to give tension to said springs.

4. A spring tire comprising a tire casing, a series of U-shaped blocks fitting end to end around and within said tire casing and having sockets therein, said U-shaped blocks having radial interlocking joints therebetween, a corresponding series of blocks slidably mounted within said U-shaped blocks one to each and having corresponding sockets therein and hollowed central portions on their bottoms, coil springs with ends in said sockets one to each pair to resiliently separate said blocks, a wheel rim, a corresponding series of nut blocks bearing against said wheel rim shaped to hold said tire casing, and a corresponding series of screw bolts extending through said wheel rim and nut blocks having rounded ends to bear against the hollowed central portions of said series of blocks fitting within said U-shaped blocks.

5. A spring tire comprising a tire casing, a series of radial U-shaped blocks fitting around within said tire casing and having sockets therein, said U-shaped blocks having radial joints therebetween, a corresponding series of blocks slidably mounted within said U-shaped blocks one to each and having corresponding sockets therein to form pairs, coil springs in said sockets one to each pair to resiliently separate said blocks, a wheel rim, a corresponding series of nut blocks shaped to hold said casing against said wheel rim and having double pins slidably engaging in holes in the blocks within said U-shaped blocks to limit turning of said nut blocks, a corresponding series of screw bolts extending through said nut blocks and bearing against the blocks within said U-shaped blocks to tensionally hold said U-shaped blocks and casing, and pins extending from said U-shaped blocks through said blocks fitting therewithin and through holes in said screw bolts to hold said parts in line and assist in assembling the same.

6. In a spring wheel, a tire casing, a series of inner blocks, a series of outer blocks, conforming to the tread and opposite sides of the tire casing and having parts embracing opposite sides of the inner blocks and extending beyond the inner faces of the latter, springs between the respective blocks of the two series, and means to mount each of the inner blocks so as to permit rocking thereof.

7. In a spring wheel, a series of inner blocks, a series of outer blocks, springs between the blocks, the outer blocks having arms slidably embracing opposite sides of the inner blocks, and means to mount the inner blocks so as to allow the free ends of the arms of the outer blocks to extend beyond the inner faces of the inner blocks.

8. In a spring wheel, a series of inner blocks having sockets on their under faces, means engaging in said sockets so as to mount said blocks to allow the latter to rock, an outer block for each inner block, and springs between the blocks.

9. In a spring wheel, a tire casing, a series of substantially U-shaped outer blocks conforming to the tread and opposite sides of the tire casing, an inner block for each outer block arranged so as to slide in the space between and be wholly embraced by the arms of the outer block, and coil springs arranged between the blocks.

10. In a spring wheel, a series of substantially U-shaped outer blocks, an inner block for each outer block arranged so as to slide in the space between the arms of the outer block, coil springs arranged between the blocks, and means freely bearing against the under face of the inner blocks to support the latter and to regulate the tension of the springs.

11. In a spring wheel, a rim, a tire casing having circumferential side edges engaged with the rim, blocks engaged with said side edges of the tire casing to hold the latter in place, a series of inner blocks, means to slidably connect the inner blocks to the first named blocks, a series of outer blocks, and spring means between the inner and outer blocks to tension the latter.

12. In a spring wheel, a series of inner blocks, an outer block for each inner block, springs between the blocks, means to mount each inner block to allow same to have rocking movement, means to restrict turning of the inner blocks, and means to slidably connect the inner and outer blocks so as to limit relative turning therebetween.

In testimony whereof we have affixed our signatures in the presence of two witnesses.

JOHN B. GABRIELSON.
GUSTAF E. SWENSON.

Witnesses:
H. O. SANDBERG,
I. E. NORDSTROM.

Copies of this patent may be obtained for five cents each, by addressing the "Commissioner of Patents, Washington, D. C."